US012626649B2

(12) United States Patent
Su et al.

(10) Patent No.: US 12,626,649 B2
(45) Date of Patent: May 12, 2026

(54) INTERFERENCE REDUCTION ELECTRONIC DEVICE

(71) Applicant: Innolux Corporation, Miaoli County (TW)

(72) Inventors: Wei-Yu Su, Miaoli County (TW); Jui-Feng Ko, Miaoli County (TW); Geng-Fu Chang, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/954,400

(22) Filed: Nov. 20, 2024

(65) Prior Publication Data

US 2025/0201177 A1 Jun. 19, 2025

(30) Foreign Application Priority Data

Dec. 18, 2023 (CN) ......................... 202311742913.6

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/0286* (2013.01); *G09G 2310/08* (2013.01); *G09G 2330/06* (2013.01)

(58) Field of Classification Search
CPC ....... G09G 3/32–3291; G09G 2300/02; G09G 2300/04–0408; G09G 2300/0421–043; G09G 2300/0804; G09G 2310/0243; G09G 2310/0267–0275; G09G 2310/0286; G09G 2310/0297; G09G 2310/04; G09G 2310/06; G09G 2310/08; G09G 2320/02; G09G 2320/0209–0223; G09G 2320/0233; G09G 2320/0242; G09G 2320/04; G09G 2330/06; G09G 2370/14
See application file for complete search history.

(56) References Cited

U.S. PATENT DOCUMENTS 8,630,198 B1 * 1/2014 Vijayaraghavan ........................... H04L 25/03343 370/252
2012/0206499 A1 * 8/2012 Cok ..................... G09G 3/3208 345/690
2019/0206319 A1 7/2019 Kim et al.
2022/0172672 A1 * 6/2022 Park ......................... G09G 3/32

* cited by examiner

*Primary Examiner* — Nathan Danielsen
(74) *Attorney, Agent, or Firm* — JCIPRNET

(57) ABSTRACT

An electronic device is provided. The electronic device includes a substrate, multiple electronic units, a data driver, and multiple data line pairs. The substrate has an active area. The electronic units are arranged in the active area in an array. Each of the electronic units includes a microcontroller and multiple electronic components. The data driver provides a differential signal. The data line pairs transmit the differential signals to the microcontrollers. The microcontroller generates multiple driving signals according to the differential signals, and inputs the driving signals to the electronic components respectively.

19 Claims, 6 Drawing Sheets

INTERFERENCE REDUCTION ELECTRONIC DEVICE

CROSS-REFERENCE TO RELATED APPLICATION

This application claims the priority benefit of China application serial no. 202311742913.6, filed on Dec. 18, 2023. The entirety of the above-mentioned patent application is hereby incorporated by reference herein and made a part of this specification.

BACKGROUND

Technical Field

The disclosure relates to an electronic device, and more particularly, to an electronic device that may reduce signal interference and electromagnetic interference.

Description of Related Art

Based on the increasing demand for resolution, the number of signal transmission traces on a substrate of an electronic device will increase and become denser, which causes a signal on the signal transmission trace susceptible to signal interference and electromagnetic interference from the signal on the adjacent signal transmission trace and distortion. Once the signal is distorted, the electronic device will malfunction. As a result, how to reduce the signal interference and electromagnetic interference of the electronic devices is one of the research focuses for those skilled in the art.

SUMMARY

This disclosure provides an electronic device that may reduce signal interference and electromagnetic interference.

According to the embodiment of the disclosure, an electronic device includes a substrate, multiple electronic units, a data driver, and multiple data line pairs. The substrate has an active area. The electronic units are arranged in the active area in an array. Each of the electronic units includes a microcontroller and multiple electronic components. The microcontroller is electrically connected to the electronic components. The data driver is disposed on the substrate. The data driver provides a differential signal. The data line pairs are coupled to the data driver and the microcontrollers. The data line pairs transmit the differential signal to the microcontrollers. The microcontroller generates multiple driving signals according to the differential signal, and inputs the driving signals to the electronic components respectively.

Based on the above, the data driver provides the differential signal. The microcontroller generates the driving signals according to the differential signal, and inputs the driving signals to the electronic components respectively. The differential signal may reduce the signal interference. The microcontroller may generate the driving signals according to the differential signal. Therefore, the electronic device may reduce the signal interference and electromagnetic interference and operate correctly.

DETAILED DESCRIPTION OF DISCLOSED EMBODIMENTS

Figure 1:
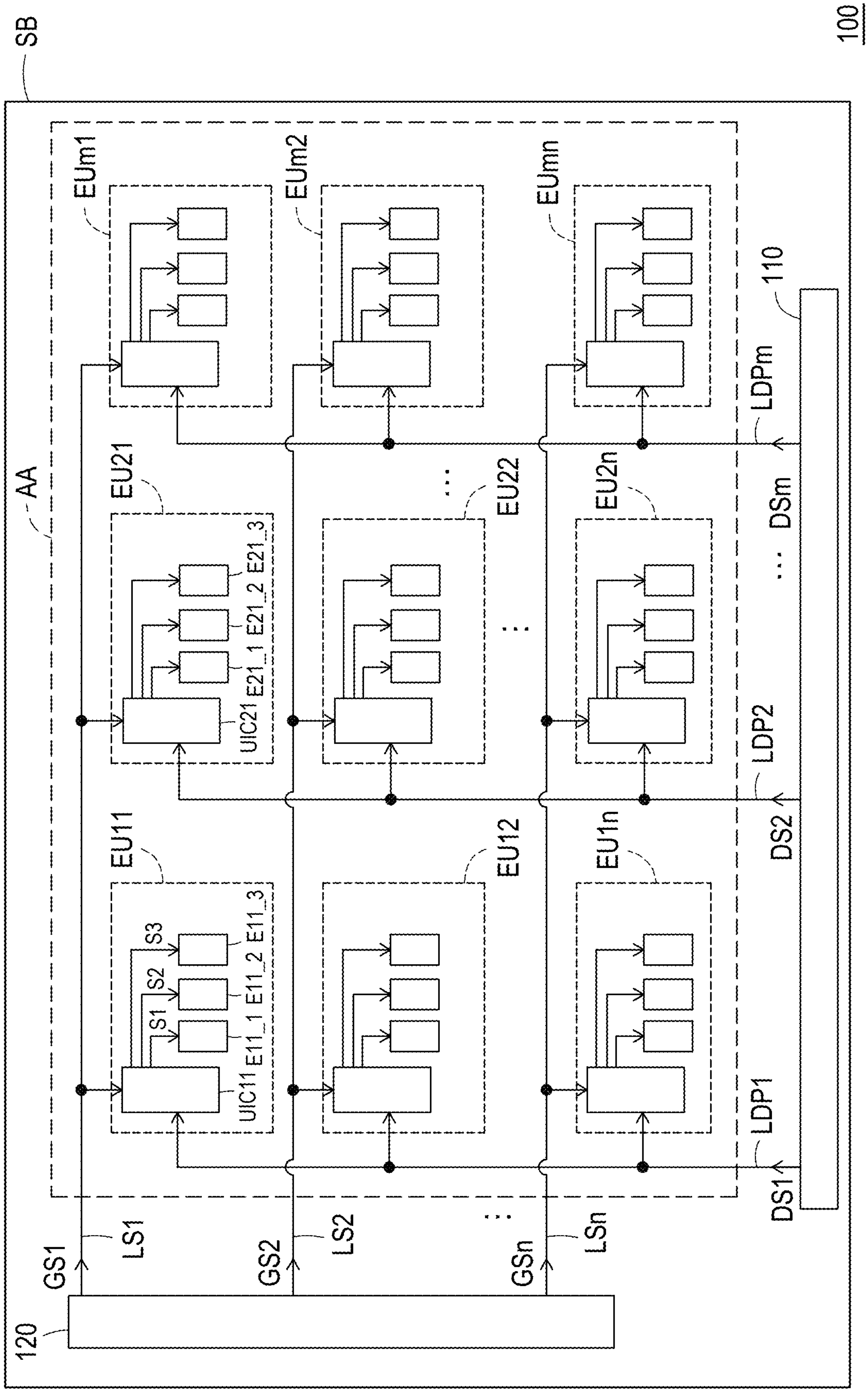
FIG. 1 is a schematic diagram of an electronic device according to the first embodiment of the disclosure.

The disclosure may be understood with reference to the following detailed description with the drawings. Note that for clarity of description and ease of understanding, the drawings of the disclosure show a part of an electronic device, and certain elements in the drawings may not be drawn to scale. In addition, the number and size of each device shown in the drawings simply serve for exemplifying instead of limiting the scope of the disclosure.

Certain terminologies are used throughout the description and the appended claims to refer to specific elements. As to be understood by those skilled in the art, electronic device manufacturers may refer to an element by different names. Herein, it is not intended to distinguish between elements that have different names instead of different functions. In the following description and claims, terminologies such as "include", "comprise", and "have" are used in an open-ended manner, and thus should be interpreted as "including, but not limited to". Therefore, the terminologies "include", "comprise", and/or "have" used in the description of the disclosure denote the presence of corresponding features, regions, steps, operations, and/or elements but are not limited to the presence of one or more corresponding features, regions, steps, operations, and/or elements.

It should be understood that when one element is referred to as being "coupled to", "connected to", or "conducted to" another element, the one element may be directly connected to the another element with electrical connection established, or intervening elements may also be present in between these elements for electrical interconnection (indirect electrical connection). Comparatively, when one element is referred to as being "directly coupled to", "directly conducted to", or "directly connected to" another element, no intervening elements are present in between.

Although terminologies such as first, second, and third may be used to describe different diverse constituent elements, such constituent elements are not limited by the terminologies. The terminologies are used simply to discriminate one constituent element from other constituent elements in the description. In the claims, the terminologies first, second, third, and so on may be used in accordance with the order of claiming elements instead of using the same terminologies. Accordingly, a first constituent element in the following description may be a second constituent element in the claims.

The electronic device in the disclosure may include a display device, an antenna device, a sensing device, a light emitting device, a touch display, a curved display, or a free shape display, but the disclosure is not limited thereto. The electronic device may include a bendable or flexible electronic device. The electronic device may include, for example, liquid crystal, light emitting diode (LED), quantum dot (QD), fluorescence, phosphor, other suitable display media, or a combination thereof, but the disclosure is not limited thereto. The LED may include, for example, an organic light emitting diode (OLED), a mini LED, a micro LED, a quantum dot LED (including QLED and QDLED), other suitable materials, or a combination thereof, but the disclosure is not limited thereto. The display device may, for example, include a tiled display device, but the disclosure is not limited thereto. The antenna device may, for example, include a liquid crystal antenna, but the disclosure is not limited thereto. The antenna device may, for example, include a tiled antenna device, but the disclosure is not limited thereto. Note that the electronic device may be any arrangement or combination of the above, but the disclosure is not limited thereto. In addition, the shape of the electronic device may be a rectangle, a circle, a polygon, a shape with a curved edge, or other suitable shapes. The electronic device may have a peripheral system, for example, a driving system, a control system, or a light source system, to support the display device, the antenna device, or the tiled device, but the disclosure is not limited thereto. The sensing device may include a camera, an infrared sensor, or a fingerprint sensor, and the disclosure is not limited thereto. In some embodiments, the sensing device may also include a flash, an infrared (IF) light source, other sensors, electronic elements, or a combination thereof, but the disclosure is not limited thereto.

In one or more embodiments of the disclosure, terminologies such as “pixel” or “pixel unit” are used as a unit for describing a specific region including at least one functional circuit for at least one specific function. The region of a “pixel” depends on the unit for providing a specific function. Adjacent pixels may share the same parts or wires, but may also include their own specific parts therein. For instance, adjacent pixels may share the same scan line or the same data line, but the pixels may also have their own transistors or capacitors.

Note that features in different embodiments described below may be replaced, recombined, or mixed with each other to form another embodiment without departing from the spirit of the disclosure.

Referring to FIG. 1, FIG. 1 is a schematic diagram of an electronic device according to the first embodiment of the disclosure. In this embodiment, an electronic device 100 includes a substrate SB, electronic units EU11 to EUmn, a data driver 110, and multiple data line pairs LDP1 to LDPm. In this embodiment, the substrate SB has an active area AA. The electronic units EU11 to EUmn are arranged in the active area AA in an array. For example, the electronic units EU11 to EUmn are arranged in an array of n columns and m rows. The electronic units EU11, EU21, . . . , EUm1 are electronic units located in the first column. The electronic units EU12, EU22, . . . , EUm2 are electronic units located in the second column. In the same way, the electronic units EU1*n*, EU2*n*, . . . , EUmn are electronic units located in the $n^{th}$ column. The electronic units EU11, EU12, . . . , EU1*n* are electronic units located in the first row. The electronic units EU21, EU22, . . . , EU2*n* are electronic units located in the second row. In the same way, the electronic units EUm1, EUm2, . . . , EUmn are the electronic units located in the $m^{th}$ row.

In this embodiment, each of the electronic units EU11 to EUmn includes a microcontroller and multiple electronic components. For example, the electronic unit EU11 includes a microcontroller UIC11 and electronic components E11_1, E11_2, and E11_3. In the electronic unit EU11, the microcontroller UIC11 is electrically connected the electronic components E11_1, E11_2, and E11_3. In the electronic unit EU12, a microcontroller UIC21 is electrically connected to electronic components E21_1, E21_2, and E21_3. In the same way, the other electronic units also have similar implementations.

In this embodiment, the data driver 110 is disposed on the substrate SB. The data driver 110 may be disposed outside the active area AA (such as a peripheral area), but the disclosure is not limited thereto. The data driver 110 provides differential signals DS1 to DSm. The data line pairs LDP1 to LDPm are respectively coupled to the data driver 110 and the corresponding microcontrollers. The data line pairs LDP1 to LDPm transmit the differential signals DS1 to DSm to the corresponding microcontrollers. For example, the data line pair LDP1 is coupled to the data driver 110 and the microcontrollers of the electronic units EU11, EU12, . . . , EU1*n*. the data line pair LDP2 is coupled to the data driver 110 and the microcontrollers of the electronic units EU21, EU22, . . . , EU2*n*. In the same way, the data line pair LDPm is coupled to the data driver 110 and the microcontrollers of the electronic units EUm1, EUm2, . . . , EUmn.

Taking the microcontroller UIC11 as an example, the microcontroller UIC11 receives the differential signal DS1, generates driving signals S1 to S3 according to the differential signal DS1, and inputs the driving signals S1 to S3 to the electronic components E11_1, E11_2, and E11_3 respectively. For example, the microcontroller UIC11 inputs the driving signal S1 to the electronic component E11_1, the driving signal S2 to the electronic component E11_2, and the driving signal S3 to the electronic component E11_3.

It is worth mentioning here that the differential signal DS1 may reduce signal interference and electromagnetic interference. The microcontroller UIC11 may generate the driving signals S1 to S3 according to the differential signal DS1. Therefore, the electronic device 100 may reduce the signal interference and electromagnetic interference, and operate correctly.

Taking the microcontroller UIC11 as an example again, the microcontroller UIC11 may decode the differential signal DS1. The differential signal DS1 is a clock embedded differential signal or a scrambled differential signal. In other words, the electronic unit EU11 may be suitable for the differential signal DS1 with different predefined types.

In this embodiment, the electronic units EU11 to EUmn respectively include three electronic components as an example. However, the disclosure is not limited to the number of electronic components. The number of electronic components of the electronic units EU11 to EUmn may be multiple. In some embodiments, the number of electronic components of the electronic units EU11 to EUmn may not be exactly the same.

In this embodiment, the electronic device 100 may be a display device. The electronic units EU11 to EUmn are pixel units respectively. The electronic components in the electronic units EU11 to EUmn may be any form of liquid crystal elements, light emitting diodes, or other light emitting elements respectively. Therefore, the driving signals (such as the driving signals S1 to S3) used to drive the electronic components may be current signals or pulse-width modulation (PWM) signals respectively.

In some embodiments, the electronic device 100 may be an antenna device or a modulation device. The electronic units EU11 to EUmn are modulation units respectively. The electronic components in the electronic units EU11 to EUmn may be any form of varactors, variable capacitors, or variable resistors respectively.

In this embodiment, the substrate SB may be a hard substrate or a flexible substrate. For example, the hard substrate may be a glass substrate or a silicon substrate, and the flexible substrate may be a plastic substrate or a polymer substrate. However, the disclosure is not limited thereto.

In this embodiment, the data line pair LDP1 includes a first data line and a second data line (not shown). The differential signal DS1 is equal to a differential result between a signal located on the first data line and a signal located on the second data line. Therefore, the differential signal DS1 may reduce the signal interference and electromagnetic interference.

In this embodiment, the electronic device 100 further includes a gate driver 120 and scan lines LS1 to LSn. The scan lines LS1 to LSn are electrically connected to the gate driver 120 and the corresponding microcontrollers. The gate driver 120 transmits gate signals GS1 to GSn to the microcontrollers respectively through the scan lines LS1 to LSn. For example, the scan line LS1 is coupled to the gate driver 120 and the microcontrollers of the electronic units EU11, EU21, . . . , EUm1. The scan line LS2 is coupled to the gate driver 120 and the microcontrollers of the electronic units EU12, EU22, . . . , EUm2. In the same way, the scan line LSn is coupled to the data driver 110 and the microcontrollers of the electronic units EU1*n*, EU2*n*, . . . , EUmn. Therefore, the gate driver 120 provides the gate signal GS1 to the microcontrollers of the electronic units EU11 to EUm1. The gate driver 120 provides the gate signal GS2 to the microcontrollers of the electronic units EU12~EUm2, and the rest may be derived by analogy.

In this embodiment, the gate driver 120 is disposed on the substrate SB, but the disclosure is not limited thereto. The gate driver 120 may be disposed outside the active area AA (such as the peripheral area), but the disclosure is not limited thereto.

Figure 2:
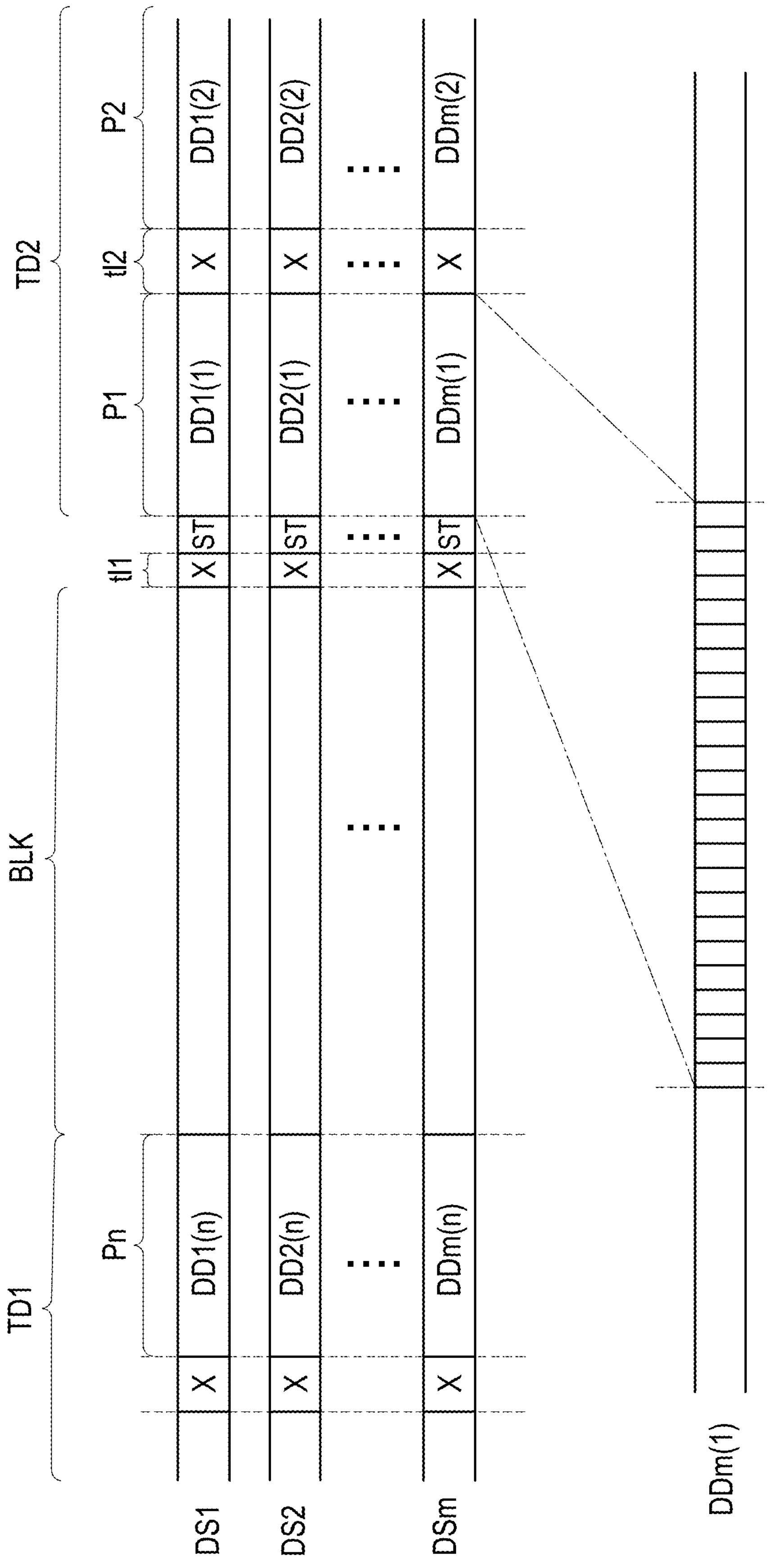
FIG. 2 is a signal timing diagram according to the first embodiment of the disclosure.

Referring to both FIG. 1 and FIG. 2, FIG. 2 is a signal timing diagram according to the first embodiment of the disclosure. FIG. 2 shows the differential signals DS1 to DSm. In this embodiment, based on timings of the gate signals GS1 to GSn, the electronic units EU11 to EUmn are selected in a column-by-column order.

In a sub-period Pn of an operation period TD1, the electronic units EU1*n*, EU2*n*, . . . , EUmn in the $n^{th}$ column are selected. The differential signal DS1 has data DD1(*n*) in the sub-period Pn of the operation period TD1. The differential signal DS2 has data DD2(*n*) in the sub-period Pn of the operation period TD1. The differential signal DSm has data DDm(n) in the sub-period Pn of the operation period TD1. Therefore, the electronic unit EU1*n* drives the electronic components in the electronic unit EU1*n* according to the data DD1(*n*). The electronic unit EU2*n* drives the electronic components in the electronic unit EU2*n* according to the data DD2(*n*). The electronic unit EUmn drives the electronic components in the electronic unit EUmn according to the data DDm(n).

In a blanking period BLK after the sub-period Pn of the operation period TD1, the differential signals DS1 to DSm have blanking data (not shown) respectively. In the blanking period BLK, the electronic units EU11 to EUmn will not update states in the operation period TD1.

After the blanking period BLK, after a delay time length tl1, the differential signals DS1 to DSm have start signals ST respectively. Subsequently, an operation period TD2 begins.

In a sub-period P1 of the operation period TD2, the electronic units EU11, EU21, . . . , EUm1 in the first column are selected. The differential signal DS1 has data DD1(1) in the sub-period P1 of the operation period TD2. The differential signal DS2 has data DD2(1) in the sub-period P1 of the operation period TD2. The differential signal DSm has data DDm(1) in the sub-period P1 of the operation period TD2. Therefore, the electronic unit EU11 outputs the driving signals S1 to S3 to the electronic components E11_1 to E11_3 respectively according to the data DD1(1), thereby driving the electronic components E11_1 to E11_3. The electronic unit EU21 drives the electronic components E21_1 to E21_3 according to the data DD21(1). The electronic unit EUm1 drives the electronic components in the electronic unit EUm1 according to the data DDm(1).

After the sub-period P1 of the operation period TD2, after a delay time length tl2, the electronic units EU12, EU22, . . . , EUm2 in the second column are selected in a sub-period P2 of the operation period TD2. The differential signal DS1 has data DD1(2) in the sub-period P2 of the operation period TD2. The differential signal DS2 has data DD2(2) in the sub-period P2 of the operation period TD2. The differential signal DSm has data DDm(2) in the sub-period P2 of the operation period TD2. Therefore, the electronic unit EU12 drives the electronic components in the electronic unit EU12 according to the data DD1(2). The electronic unit EU22 drives the electronic components in the electronic unit EU22 according to the data DD2(2). The electronic unit EUm2 drives the electronic components in the electronic unit EUm2 according to the data DDm(2).

In this embodiment, the delay time lengths tl1 and tl2 may be adjusted. In some embodiments, at least one of the delay time lengths tl1 and tl2 may be omitted.

Figure 3:
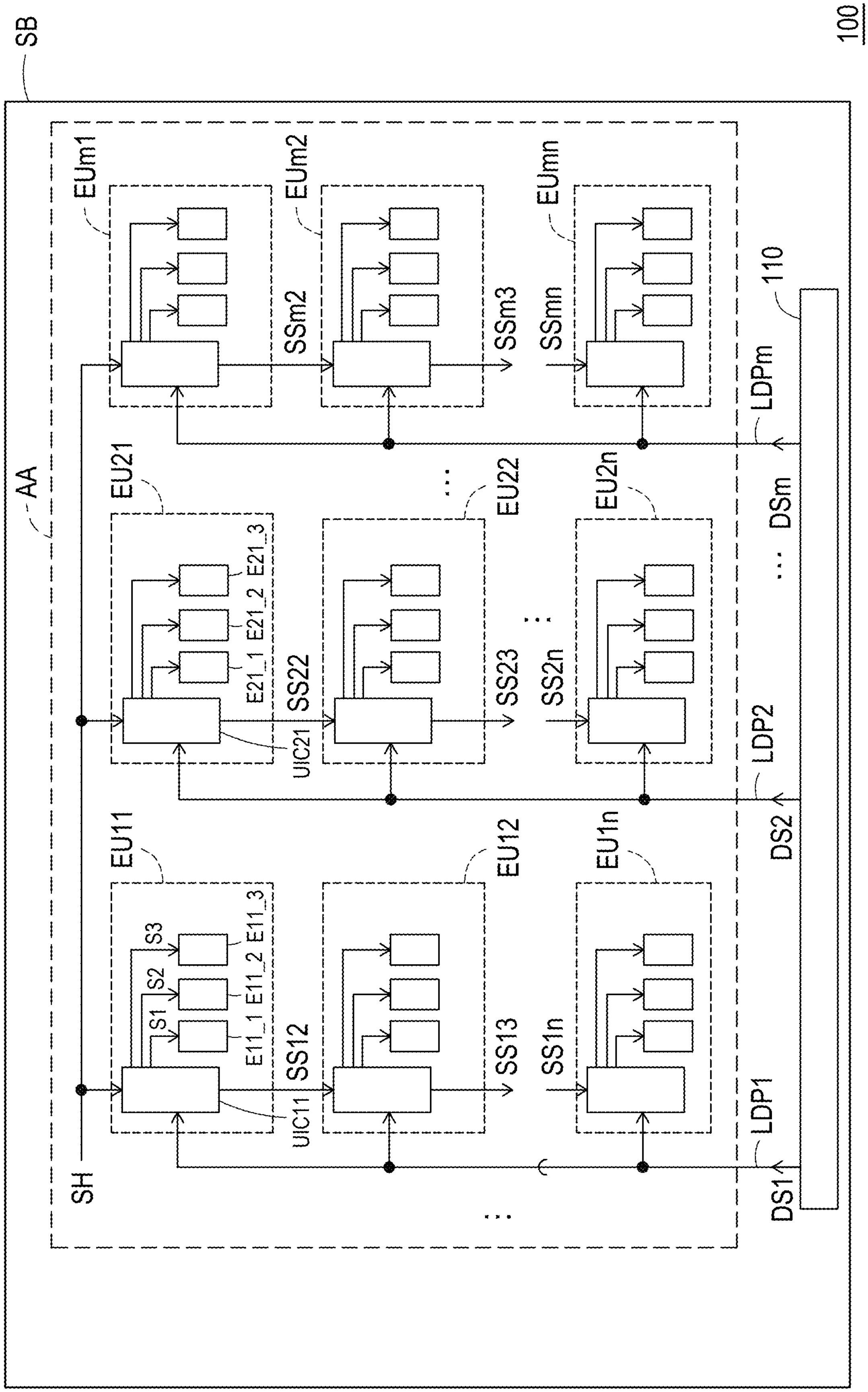
FIG. 3 is a schematic diagram of an electronic device according to the second embodiment of the disclosure.

Referring to FIG. 3 together, FIG. 3 is a schematic diagram of an electronic device according to the second embodiment of the disclosure. In this embodiment, an electronic device 200 includes the substrate SB, the electronic units EU11 to EUmn, the data driver 110, and the data line pairs LDP1 to LDPm. In this embodiment, the substrate SB has the active area AA. The electronic units EU11 to EUmn are arranged in the active area AA in an array. An arrangement method among the electronic units EU11 to EUmn, the data driver 110, and the data line pairs LDP1 to LDPm has been clearly described in the embodiment of FIG. 1. Therefore, the same details will not be repeated in the following.

The electronic units EU11 to EUmn are selected in a column-by-column order. In this embodiment, the electronic units EU11, EU21, . . . , EUm1 located in the first column receive a high level signal SH and operate. Therefore, the microcontrollers (i.e., first column microcontrollers) of the electronic units EU11, EU21, . . . , EUm1 start to receive the differential signals DS1 to DSm. When the differential signals DS1 to DSm received by the microcontrollers of the electronic unit EU11, EU21, . . . , EUm1 include a start protocol, the microcontrollers of the electronic unit EU11, EU21, . . . , EUm1 output the driving signals to the corresponding electronic components. In addition, the microcontrollers of the electronic units EU11, EU21, . . . , EUm1 further output scan signals SS12, SS22, . . . , SSm2 to the electronic units EU12, EU22, . . . , EUm2 in the next column respectively.

Taking the electronic units EU11 and EU12 as an example, the electronic unit EU11 receives the high level signal SH and operates. The microcontroller UIC11 receives the differential signal DS1. When the microcontroller UIC11 receives the start protocol in the differential signals DS1 to DSm, the microcontroller UIC11 generates the driving signals S1 to S3 according to the differential signal DS1, and inputs the driving signals S1 to S3 to the electronic components E11_1, E11_2, and E11_3 respectively. In addition, the microcontroller UIC11 further generates the scan signal SS12 and provides the scan signal SS12 to the electronic unit EU12.

The electronic unit EU12 receives the scan signal SS12 and operates. The microcontroller of the electronic unit EU12 generates the driving signals S1 to S3 according to the differential signal DS1, and inputs the driving signals S1 to S3 to the electronic components in the electronic unit EU12 respectively. The electronic unit EU12 generates a scan signal SS13 according to the scan signal SS12 and provides the scan signal SS13 to the electronic unit in the next column.

Figure 4:
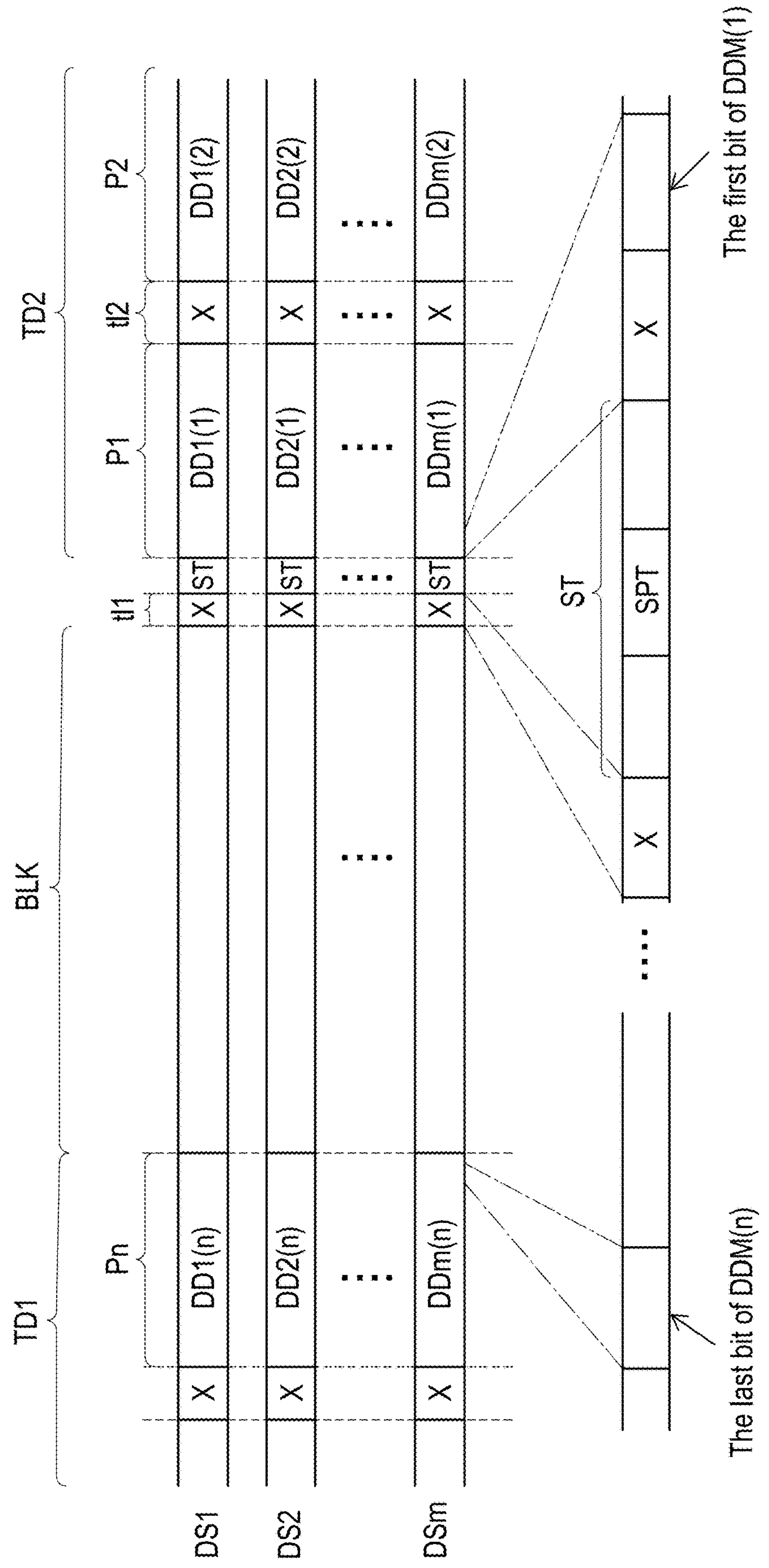
FIG. 4 is a signal timing diagram according to the second embodiment of the disclosure.
Figure 5:
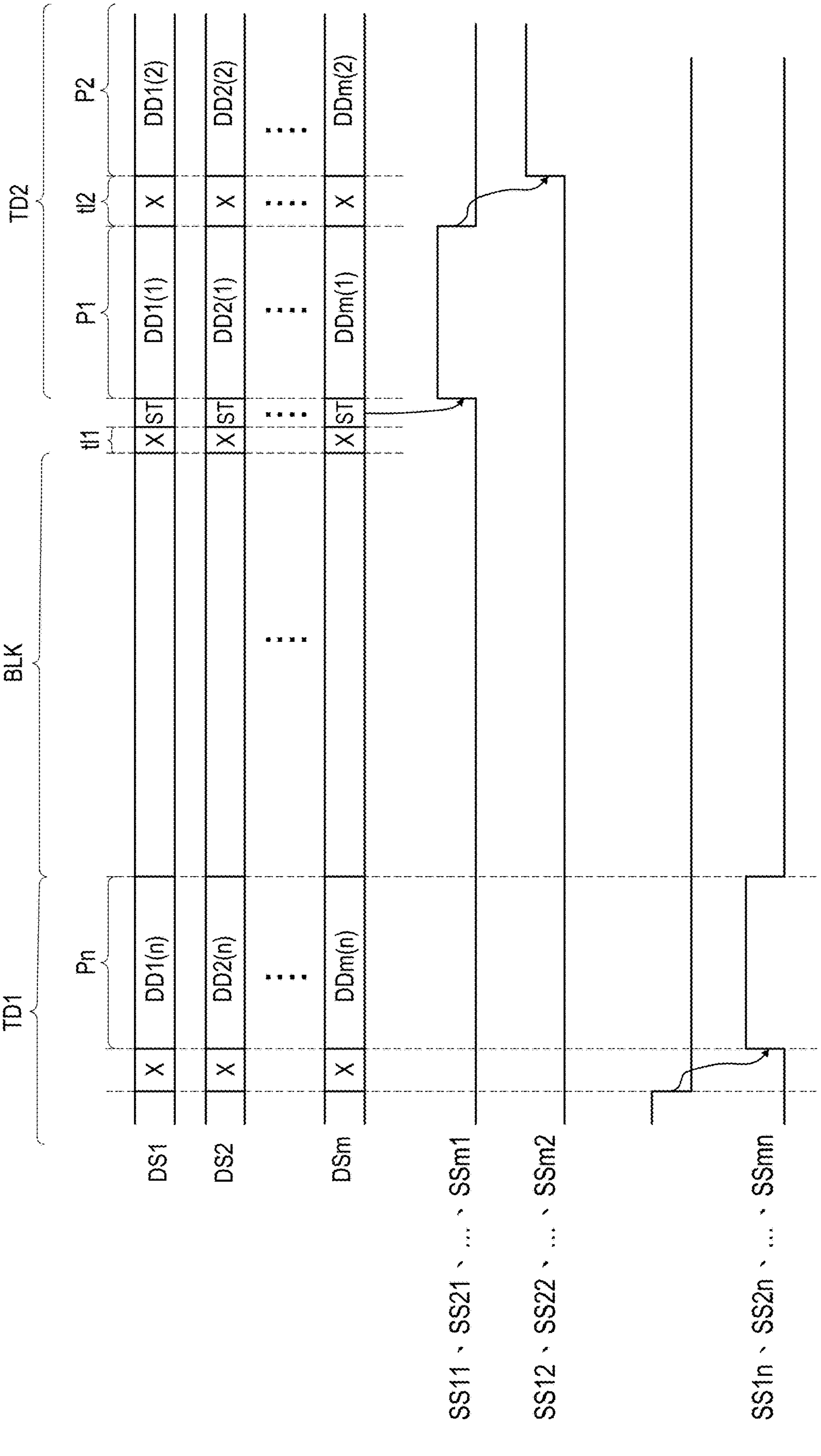
FIG. 5 is a signal timing diagram according to the second embodiment of the disclosure.

Referring to FIG. 3, FIG. 4, and FIG. 5 together, FIG. 4, and FIG. 5 are respectively signal timing diagrams according to the second embodiment of the disclosure. In this embodiment, in the sub-period Pn of the operation period TD1, the electronic units EU1$n$, EU2$n$, . . . , EUmn in the $n^{th}$ column operate according to scan signals SS1$n$, SS2$n$, . . . , SSmn. The differential signal DS1 has the data DD1($n$) in the sub-period Pn of the operation period TD1. The differential signal DS2 has the data DD2($n$) in the sub-period Pn of the operation period TD1. The differential signal DSm has the data DDm(n) in the sub-period Pn of the operation period TD1. Therefore, the electronic unit EU1$n$ drives the electronic components in the electronic unit EU1$n$ according to the data DD1($n$). The electronic unit EU2$n$ drives the electronic components in the electronic unit EU2$n$ according to the data DD2($n$). The electronic unit EUmn drives the electronic components in the electronic unit EUmn according to the data DDm(n).

In the blanking period BLK after the sub-period Pn of the operation period TD1, the differential signals DS1 to DSm have the blanking data (not shown) respectively. In the blanking period BLK, the electronic units EU11 to EUmn will not update the states in the operation period TD1.

After the blanking period BLK, after the delay time length tl1, the differential signals DS1 to DSm have the start signals ST respectively. Subsequently, the operation period TD2 begins. In this embodiment, the start signal ST includes a start protocol SPT. The start protocol SPT has a wave pattern or a digital code that may be recognized by the electronic units EU11, EU21, . . . , EUm1. When the electronic units EU11, EU21, . . . , EUm1 receive the high level signal SH and the start protocol SPT, the electronic units EU11, EU21, . . . , EUm1 generate scan signals SS11, SS21, . . . , SSm1 in the sub-period P1 of the operation period TD2. The microcontroller UIC11 operates according to the scan signal SS11 in the sub-period P1 of the operation period TD2, and outputs the driving signals S1 to S3 to the electronic components E11_1 to E11_3 respectively according to the data DD1(1), thereby driving the electronic components E11_1 to E11_3. In addition, the microcontroller UIC11 generates a scan signal SS12 according to the scan signal SS11 in the sub-period P2 of the operation period TD2.

For example, the microcontroller UIC11 may include a shift register. The microcontroller UIC11 receives the high level signal SH. When the differential signal DS1 received by the microcontroller UIC11 includes the start protocol SPT, the microcontroller UIC11 outputs the driving signals S1 to S3 to the electronic components respectively, and outputs the scan signal to the shift register of the microcontroller in the next column (i.e., the second column).

The microcontroller UIC21 operates according to the scan signal SS21 in the sub-period P1 of the operation period TD2, thereby driving the electronic components E21_1 to E21_3 according to the data DD2(1). In addition, the microcontroller UIC21 generates a scan signal SS22 according to the scan signal SS21 in the sub-period P2 of the operation period TD2.

The microcontroller UICm1 operates according to the scan signal SSm1 in the sub-period P1 of the operation period TD2, thereby driving the electronic components in the electronic unit EUm1 according to the data DDm(1). In addition, the microcontroller UIC21 generates a scan signal SSm2 according to the scan signal SSm1 in the sub-period P2 of the operation period TD2.

Figure 6:
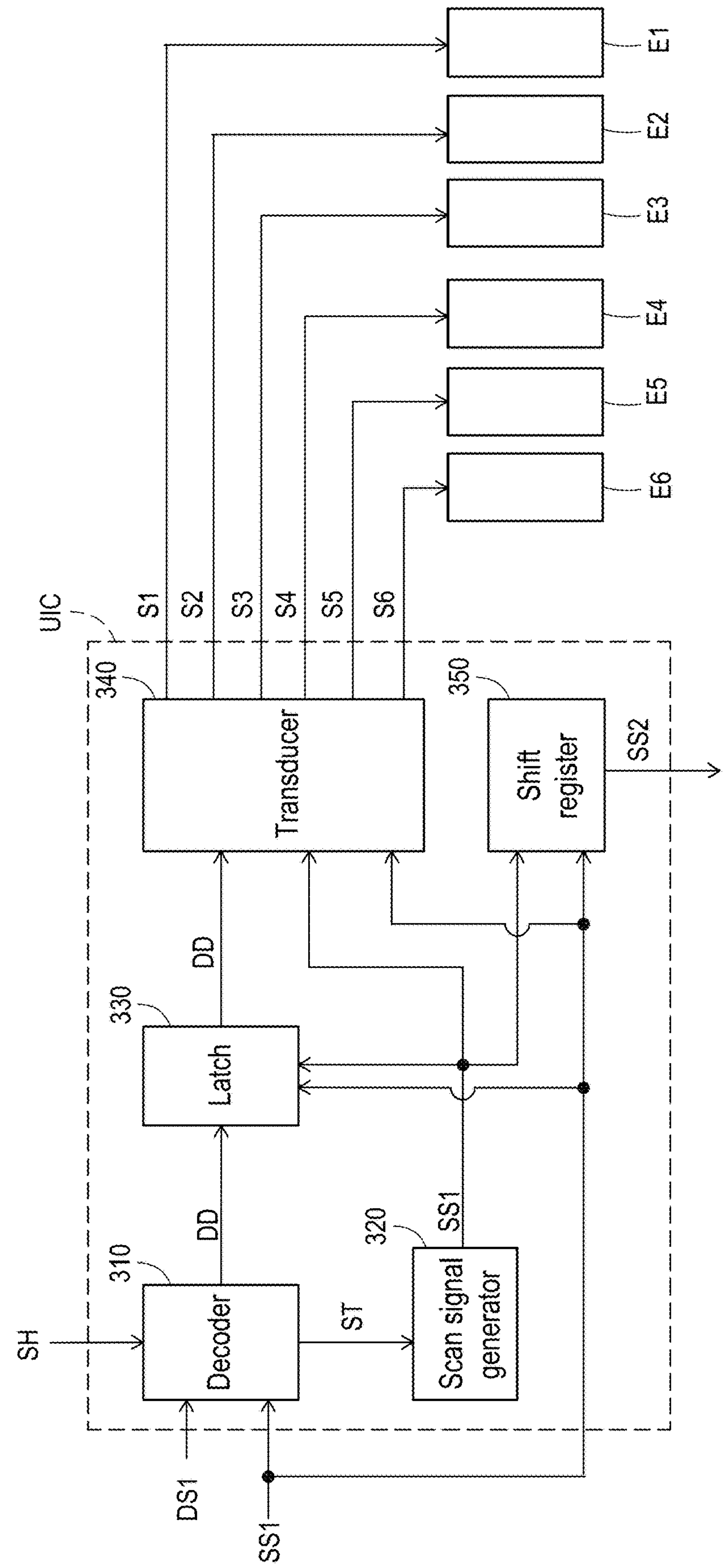
FIG. 6 is a schematic diagram of a microcontroller according to an embodiment of the disclosure.

Referring to FIG. 6, FIG. 6 is a schematic diagram of a microcontroller according to an embodiment of the disclosure. In this embodiment, a microcontroller UIC is configured to drive electronic components E1 to E6. The microcontroller UIC includes a decoder 310, a scan signal generator 320, a latch 330, a transducer 340, and a shift register 350. The microcontroller UIC may be a universal microcontroller. The microcontroller UIC may be suitable, for example, for the microcontroller UIC 11 or the microcontroller of the electronic unit EU12 shown in FIG. 3.

First, taking the microcontroller UIC as the microcontroller UIC11 shown in FIG. 3 as an example, the decoder 310 receives the differential signal DS1 and generates the start signal ST. In addition, the decoder 310 generates a signal DD according to the differential signal DS1. In this example, the signal DD may be the data DD1(1) shown in FIG. 3. For example, the decoder 310 may decode the differential signal DS1 to generate the start signal ST and the signal DD.

In some embodiments, the differential signal DS1 is a clock embedded differential signal, and the decoder 310 may decode the differential signal DS1 to generate the start signal ST, the signal DD, and a clock (not shown).

In this example, the scan signal generator 320 is electrically connected to the decoder 310, the latch 330, the transducer 340, and the shift register 350. The scan signal generator 320 receives the start signal ST and outputs a scan signal SS1 to the latch 330. In this example, the scan signal SS1 may be the scan signal SS11 shown in FIG. 3. Specifically, the scan signal generator 320 generates the scan signal SS1 according to the start signal ST, and outputs the scan signal SS1 to the latch 330. The latch 330 latches the signal DD from the decoder 310 in response to the scan signal SS1. The transducer 340 outputs driving signals S1 to S6 to the electronic components E1 to E6 according to the signal DD from the latch 330 in response to the scan signal SS1.

In addition, the scan signal SS1 is output to the shift register 350. The shift register 350 outputs a scan signal SS2 to the shift register in the next column. In this example, the scan signal SS2 may be the scan signal SS12 shown in FIG. 3.

Taking the microcontroller UIC as the microcontroller of the electronic unit EU12 shown in FIG. 3 as an example, the decoder 310 receives the differential signal DS1 in response to the scan signal SS1 from the shift register in the previous column. In addition, the decoder 310 generates the signal DD according to the differential signal DS1. The signal DD may be the data DD1(2). For example, the decoder 310 may decode the differential signal DS1 to generate the signal DD.

In this example, the scan signal generator 320 is not operating. The latch 330 latches the signal DD from the decoder 310 in response to the scan signal SS1 of the shift register in the previous column. The transducer 340 outputs the driving signals S1 to S6 to the electronic components E1 to E6 according to the signal DD from the latch 330 in response to the scan signal SS1.

In addition, the scan signal SS1 is output to the shift register 350. The shift register 350 output the scan signal SS2 to the shift register in the next column.

In an embodiment, the signal DD is a digital signal. The driving signals S1 to S6 may be current signals respectively. Therefore, the transducer 340 is a conversion circuit that converts a digital signal into a current signal. In an embodiment, the signal DD is a digital signal. The driving signals S1 to S6 may be PWM signals respectively. Therefore, the transducer 340 is a conversion circuit that converts the digital signal into the PWM signal. In an embodiment, the signal DD is a digital signal. The driving signals S1 to S6 may be voltage signals respectively. Therefore, the transducer 340 is a conversion circuit that converts the digital signal into the voltage signal.

In this embodiment, the electronic components E1 to E6 may come from the electronic units. In other words, the microcontroller UIC mat drive the electronic components of at least one electronic unit.

Based on the above, the electronic device includes the electronic units and the data driver. The data driver provides the differential signal. The microcontroller of the electronic unit generates the driving signals according to the differential signal, and inputs the driving signals to the electronic components respectively. The differential signal may reduce the signal interference. The microcontroller may generate the driving signal according to the differential signal. In this way, the electronic device may reduce the signal interference and electromagnetic interference and operate correctly. In addition, the microcontroller may decode the differential signal. The differential signal is a clock embedded differential signal or a scrambled differential signal Therefore, the electronic unit may be suitable for the differential signal with different predefined types.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. An electronic device, comprising:

a substrate having an active area;

a plurality of electronic units arranged in the active area in an array, wherein each of the electronic units comprises a microcontroller and a plurality of electronic components, and the microcontroller is electrically connected to the electronic components;

a data driver disposed on the substrate, wherein the data driver provides a differential signal; and a plurality of data line pairs coupled to the data driver and the microcontrollers to transmit the differential signal to the microcontrollers;

wherein the microcontroller generates a plurality of driving signals according to the differential signal, and inputs the driving signals to the electronic components respectively, wherein the electronic units are arranged in an array of a plurality of columns and a plurality of rows, wherein each of the microcontrollers comprises a shift register, and wherein a plurality of first column microcontrollers of the electronic units located in the first column respectively receive high level signals, and when the differential signal received by the first column microcontrollers comprises a start protocol, the first column microcontrollers respectively output the driving signals to the electronic components, and output a scan signal to a shift register in the next column.

2. The electronic device according to claim 1, wherein the electronic device further comprises a gate driver and a plurality of scan lines, the scan lines are electrically connected to the gate driver and the microcontrollers, and the gate driver transmits a plurality of gate signals to the microcontrollers through the scan lines.

3. The electronic device according to claim 1, wherein each of the microcontrollers further comprises a decoder, a scan signal generator, a latch, and a transducer, the decoder receives the differential signal and generates a start signal, and the scan signal generator receives the start signal and outputs the scan signal to the latch and the transducer, so that the transducer outputs the driving signals to the electronic components according to a signal from the latch.

4. The electronic device according to claim 3, wherein the scan signal is output to the shift register, so that the shift register outputs another scan signal to the shift register in the next column.

5. The electronic device according to claim 3, wherein the latch latches a signal from the decoder in response to the scan signal.

6. The electronic device according to claim 3, wherein the transducer of each of the first column microcontrollers outputs the driving signals in response to the scan signal output by the scan signal generator of each of the first column microcontrollers.

7. The electronic device according to claim 3, wherein the decoder of each of the first column microcontrollers receives the differential signal in response to the scan signal output by the scan signal generator of each of the first column microcontrollers.

8. The electronic device according to claim 7, wherein the latch of each of the first column microcontrollers latches a signal from the decoder of each of the first column microcontrollers in response to the scan signal output by the scan signal generator of each of the first column microcontrollers.

9. The electronic device according to claim 3, wherein the transducer of each of the second column microcontrollers outputs the driving signals in response to a scan signal output by the shift register of each of the first column microcontrollers.

10. The electronic device according to claim 3, wherein the scan signal generator of each of the second column microcontrollers is not operating.

11. The electronic device according to claim 3, wherein the decoder of each of the second column microcontrollers receives the differential signal in response to a scan signal output by the shift register of each of the first column microcontrollers.

12. The electronic device according to claim 11, wherein the latch of each of the second column microcontrollers latches a signal from the decoder of each of the second column microcontrollers in response to a scan signal output by the shift register of each of the first column microcontrollers.

13. The electronic device according to claim 1, wherein the data driver is disposed outside the active area.

14. The electronic device according to claim 1, wherein the electronic units are respectively pixel units.

15. The electronic device according to claim 1, wherein the electronic units are respectively modulation units.

16. The electronic device according to claim 1, wherein the differential signal is a clock embedded differential signal.

17. The electronic device according to claim 1, wherein the differential signal is a scrambled differential signal.

18. The electronic device according to claim 1, wherein each of the driving signals is a current signal.

19. The electronic device according to claim 1, wherein each of the driving signals is a pulse-width modulation signal.

* * * * *